United States Patent [19]
Smith

[11] Patent Number: 5,855,014
[45] Date of Patent: Dec. 29, 1998

[54] GETFIELD FUNCTION FOR A RELATIONAL WORKGROUP PLATFORM USING KEYWORD AND WORKFLOW DATABASES

[75] Inventor: Gordon Samuel Smith, New York, N.Y.

[73] Assignee: Application Partners, Inc., Edison, N.J.

[21] Appl. No.: 739,864

[22] Filed: Oct. 31, 1996

Related U.S. Application Data

[60] Provisional application No. 60/007,213 Nov. 3, 1995.
[51] Int. Cl.$^6$ .................................................. G06F 17/30
[52] U.S. Cl. .................. 707/3; 707/201; 707/10; 707/203
[58] Field of Search ................ 707/3, 201, 203, 707/10

[56] References Cited

U.S. PATENT DOCUMENTS

| | | | |
|---|---|---|---|
| 5,339,392 | 8/1994 | Risberg et al. | 345/333 |
| 5,499,359 | 3/1996 | Vijaykumar | 707/201 |
| 5,630,066 | 5/1997 | Gosling | 395/200.51 |
| 5,666,490 | 9/1997 | Gillings et al. | 395/200.68 |
| 5,680,615 | 10/1997 | Marlin et al. | 707/103 |
| 5,721,913 | 2/1998 | Ackroff et al. | 1/1 |

OTHER PUBLICATIONS

"Lotus Notes Application Developer's Reference, Release 3", Lotus Development Corporation, Cambridge, MA (1993) Chapter–1.

Betty Vandenbosch et al, Lotus Notes and Collaboration: Le plus ca change. . ., IEEE 1996, 61–71.

Kenneth Moore and Michelle Peterson, A Groupware Benchmark Based on Lotus Notes, IEEE 1996, 500–507.

*Primary Examiner*—Thomas G. Black
*Assistant Examiner*—Srirama Channavajjala
*Attorney, Agent, or Firm*—Lerner, David, Littenberg, Krumholz & Mentlik

[57] ABSTRACT

Described herein is a Relational Workgroup Platform. A Relational Workgroup Platform comprising a workgroup platform; and a @WITGetField( ) functionality. The workgroup platform, illustrated herein by Lotus Notes, comprises a server functionality as means of storing databases for and amongst a network of computer workstations, said databases comprising data fields and a set of functions for manipulating data and data fields within said databases, and for writing data to and retrieving data from said data fields from within any one database. The Relational Workgroup Platform of the present invention is created by adding to the workgroup platform a @WITGetField( ) functionality that comprises means for retrieving data from a data field of any one of the databases and transferring same to any other said database and wherein said @WITGetField( ) functionality is usable as an argument in other functions.

14 Claims, 8 Drawing Sheets

FIG. 2

| | SUN | MON | TUE | WED | THU | FRI | SAT |
|---|---|---|---|---|---|---|---|
| RUN | YES | YES | YES | YES | YES | YES | YES |
| BEGIN | 12:00 AM | 12:00 AM | 12:00 AM | 12:00 AM | 12:00 AM | 12:00 AM | 12:00 AM |
| END | 11:59 PM | 11:59 PM | 11:59 PM | 11:59 PM | 11:59 PM | 11:59 PM | 11:59 PM |

API WORKFLOW PROCESS

Workflow Process Name: Create Rollup Doc
Brief Description of the Process: Create Rich Text field which contains a doclink in each of the related documents
Polling: One Shot

TIMING SCHEDULE

FIND TRIGGER EVENTS TO START ACTIONS

: Any Requests?

CREATE ACTIONS & ASSOCIATED PARAMETERS

| ACTION 1 | Create Output Document |
|---|---|
| ACTION 2 | Create DocLink to Relevant source docs on Output doc |
| ACTION 3 | |
| ACTION 4 | |
| ACTION 5 | |
| ACTION 6 | |
| ACTION 7 | |
| ACTION 8 | |

FIG. 3

| | Section One |
|---|---|
| API Trigger Information | |

Workflow Process Name: Create Rollup Doc
Comments: Any Requests?

FIND TRIGGER DOCUMENT(S) TO START ACTION(S)

Poll a shared network drive for a file

OR

Trigger Database List

DEFINE HOW TO FIND TRIGGER DOCUMENTS

Selection Formula

OR

| Use View | View Name |
|---|---|
| Time | Docs by Type |

KEY INFORMATION
Use Key Information

| Key Name | Formula Or Value | Data Type |
|---|---|---|
| "Trigger" | Formula | Text |

Office

Section One

[API] Source Information

Workflow Process Name: Create Rollup Doc
Action Name: Create Doclink to Relevant source docs on Output doc
Comments: Relevent Source Docs

FIND SOURCE DOCUMENT(S) TO USE IN ACTION

| Source Database List |
|---|
| "test64k" |

DEFINE HOW TO FIND SOURCE DOCUMENT(S)

| Selection Formula |
|---|
|  |

OR

| Use View | View Name |
|---|---|
| Type | Docs by Type |

KEY INFORMATION
Use Key Information

| Key Value | Formula Or Value | Data Type |
|---|---|---|
| "Source" | Formula | Text |
|  | Formula | Text |
|  | Formula | Text |

Office

FIG. 7

| | Section One |
|---|---|
| [API] Target Information | |

Workflow Process Name: Create Rollup Doc
Action Name: Data Doclink to Relevant source docs on Output doc
Comments: Output Doc previously created

TARGET DATABASE(S) TO USE IN ACTION

| Target Database List |
|---|
| "test64k" |

DEFINE HOW TO FIND TARGET DOCUMENT(S)

| Selection Formula |
|---|
| |

OR

| Use View | View Name |
|---|---|
| Yes | Docs by Type |

KEY INFORMATION
Use Key Information

| Key Value | Formula Or Value | Data Type |
|---|---|---|
| "Target" | Formula | Text |
| | Formula | Text |
| | Formula | Text |

Office

FIG. 8

Section One

[API] [Reference information]

---

[Workflow Process Name:] Create Rollup Doc
[Action Name:] Create Output Document
[Comments:] See if Target Exists

[FIND REFERENCE DATABASES]

| Database List |
|---|
| "test64k.nsf" |

[DEFINE HOW TO FIND DOCUMENT(S)]

| [Selection Formula] |
|---|
| |

[OR]

| [Use View] | [View Name] |
|---|---|
| Yes | Docs by Type |

[KEY INFORMATION]
Use Key Information

| [Key Value] | Formula Or Value | [Data Type] |
|---|---|---|
| "Target" | Formula | Text |
| | Formula | Text |
| | Formula | Text |

Section Two

[API] [Reference information]

---

Office

GETFIELD FUNCTION FOR A RELATIONAL WORKGROUP PLATFORM USING KEYWORD AND WORKFLOW DATABASES

RELATED U.S. APPLICATION DATA

This patent application claims the benefit under 35 U.S.C. §119(e) of United States provisional application No. 60/007,213, filed Nov. 3, 1995.

BACKGROUND OF THE INVENTION

This invention relates to the field of computer software in general, development software in particular, and still more particularly to workgroup platforms, also referred to as network platforms.

BRIEF SUMMARY OF THE INVENTION

Described herein is a Lotus Notes-based add-in server task for executing workflow processes. The invention provides @WITGetField functionality, explained more fully below, that permits retrieval of data fields from documents within the database platform. The preferred embodiment comprises a single executable, a keyword database, and a workflow control database. When added in to a Workgroup Platform such as Lotus Notes, a Relational Workgroup Platform (RWP) is created.

The keyword database contains a list of keywords that are recognized by the executable is as command syntax in addition to the built-in Notes syntax are used by databases created using the control database template during the development process.

The control database template is a Notes-based database template used to instruct the executable by providing means for creating and containing one or more workflow control documents, trigger information forms, action information forms, source information forms, target information forms, and reference information forms.

The workflow control document contains timing schedule data defining the dates days and times during which the workflow control document is to be loaded and run. Notes-based DocLinks link the workflow control document(s) to a trigger information form and to one or more action information forms; an optional trigger information form and/or action information forms.

The trigger information form contains a list of databases, or a list of formulas to derive the list of databases, in which one or more trigger documents may be located and instructions for finding said trigger documents. If a trigger document is found to be present within the specified databases, actions defined by the action information forms are executed.

Each said action information form has may have DocLinks to at least one source information form, target information form, or reference information form; and instructions specifying an action to be performed upon said one or more forms dependent on the action it represents. Each action information form corresponds to a single action. Actions are generally performed on source documents and the results of the action outputted in the form of a target document.

Each source information form contains a list of databases, or a list of formulas to derive the list of databases, in which one or more source documents may be located, instructions for identifying and locating said source documents, instructions for identifying and locating specific data within said source documents, and instruction for modifying data within said source documents.

Each target information form contains a list of databases, or a list of formulas to derive the list of databases, in which one or more target documents may be located or will be placed, instructions for placing or locating said target documents, instructions for locating specific data within said target documents, and instructions for modifying data within said target documents.

The reference information form is optional and contains a list of databases, or a list of formulas to derive the list of databases, in which a reference document may be located, instructions for locating said reference document, instructions for locating specific data within said reference document, and instructions for modifying said data within said reference document.

The single executable is a software program that carries out the following steps:

1. examining all workflow control documents at regular intervals startup;
2. determining which workflow control documents contain timing schedules specifying that they be run during the current day and time;
3. loading said workflow control documents determined to be currently run into memory;
4. examining at regular intervals the information read from the trigger information forms linked to each said workflow control document to determine if appropriate trigger conditions have been satisfied by searching the databases specified within said trigger information form and determining whether the specified trigger document or Documents exist;
5. executing, if said trigger document or Documents exist condition exists or occurs, each action specified by each of said one or more optional action information forms linked to each said workflow control document; and
6. searching for the existence of an End Document or Re-Read Document and regular time intervals, the existence of which results in either the termination of the executable or the re-examining of all workflow control documents, respectively.

The executable enters an idle state when not searching for documents or executing workflow processes. This frees up server system resources for use by the network other processes.

BRIEF DESCRIPTION OF THE DRAWINGS

FIG. 2 depicts a representative Workflow Control Document.

FIG. 3 depicts a representative Trigger Information Form.

Figure 4:
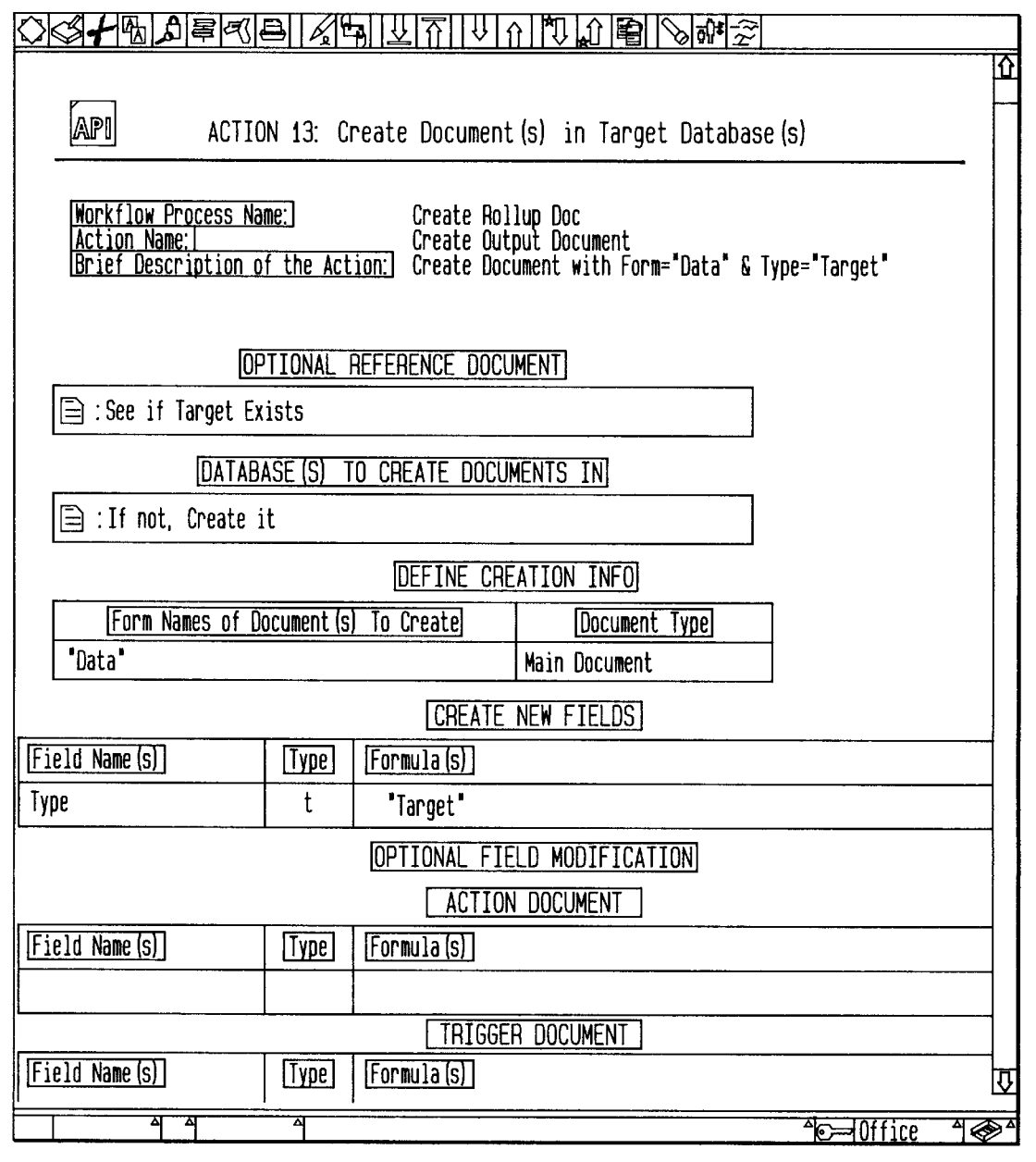

FIG. 4 depicts a representative Action Information Form for the action "Create Document(s) in Target Database(s)."

Figure 5:
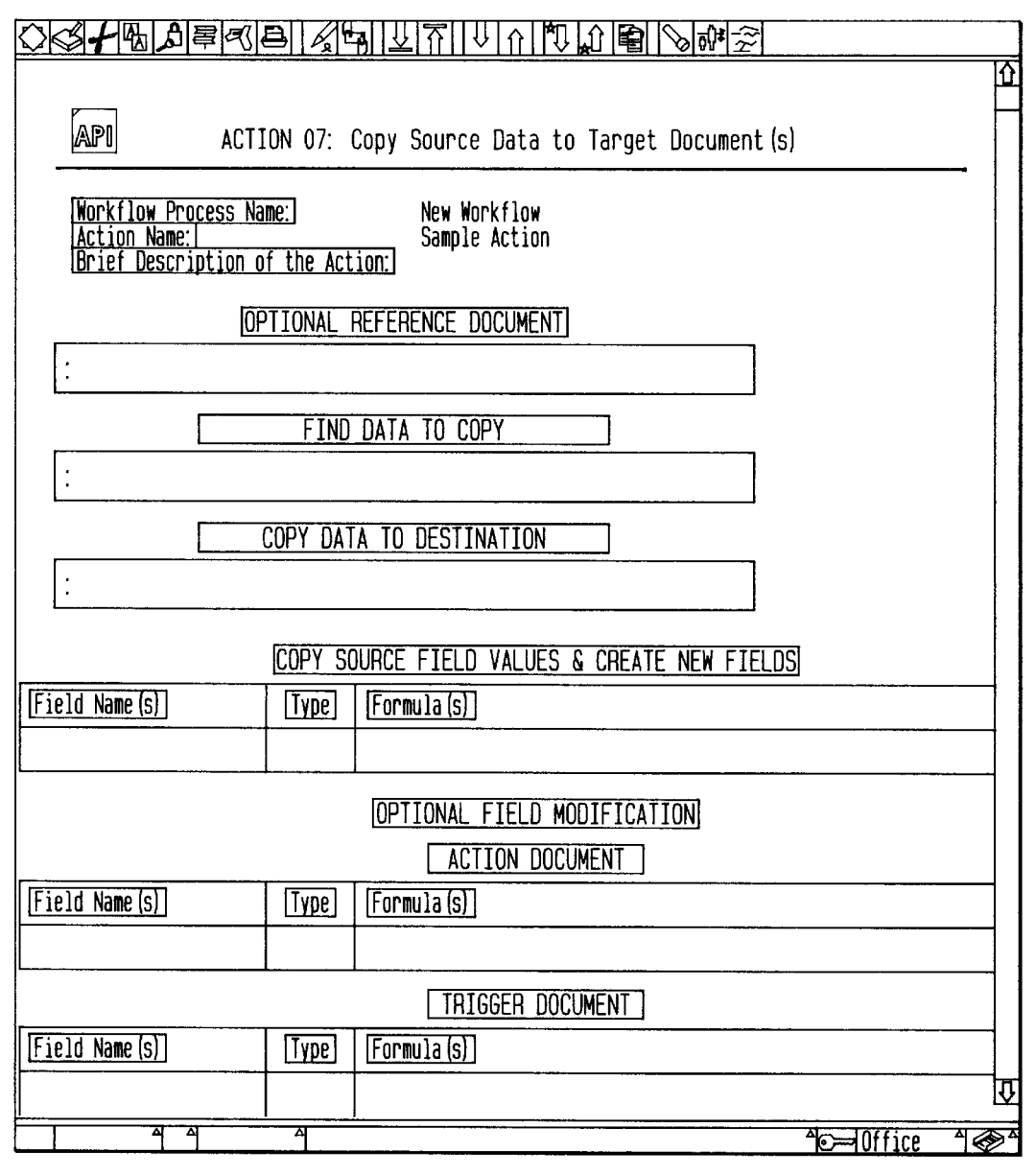

FIG. 5 depicts another representative Action Information Form for the action "Copy Source Data to Target Document(s)."

FIG. 6 depicts a representative Source Information Form.

FIG. 7 depicts a representative Target Information Form.

FIG. 8 depicts a representative Reference Information Form.

DETAILED DESCRIPTION OF THE INVENTION

Figure 1:
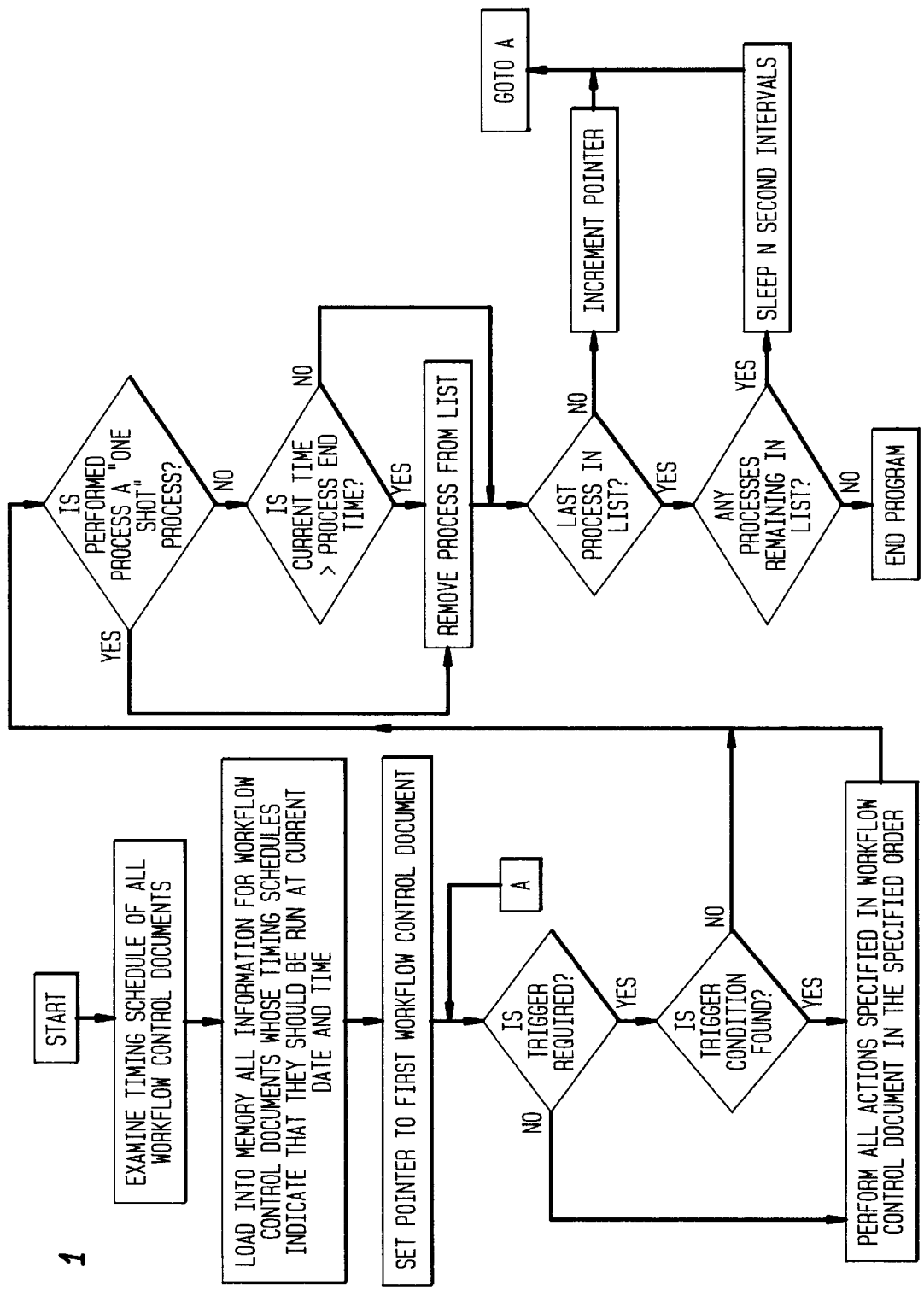
FIG. 1 is a flowchart of the operation of the Executable.

Described herein is a Relational Workgroup Platform that comprises a workgroup platform; and a @WITGetField( )

functionality. The workgroup platform, illustrated herein by Lotus Notes, comprises a server functionality as means of storing databases for and amongst a network of computer workstations, said databases comprising data fields and a set of functions for manipulating data and data fields within said databases, and for writing data to and retrieving data from said data fields from within any one database. The Relational Workgroup Platform of the present invention is created by adding to the workgroup platform a @WITGetField( ) functionality that comprises means for retrieving data from a data field of any one of the databases and transferring same to any other said database and wherein said @WITGetField( ) functionality is usable as an argument in other functions.

The preferred Relational Workgroup Platform is illustratively effected through a Notes-based add-in server task for executing workflow processes. The Notes-based add-in server task comprises a single executable, a keyword database, and a workflow control database or workflow control database template from which a workflow control database may be created. The keyword database contains a list of keywords that are recognized by the executable as command syntax in addition to the built-in Notes syntax. The workflow control database template is preferably a Notes-based template comprising means for creating and containing a workflow control document, a trigger information form, at least one action information form, a source information form, a target information form, and a Reference information form. The workflow control document contains timing schedule data defining the dates and times during which the workflow control document is to be loaded and run; Notes-based DocLinks link the workflow control document to a trigger information form and to one or more action information forms; The trigger information form contains a list of databases in which one or more trigger documents may be located and instructions for finding said trigger documents. If a trigger document is found to be present within the specified databases, actions defined by the action information forms are executed. Each said action information form has DocLinks to at least one source information form, target information form, or Reference information form; and instructions specifying an action to be performed upon said one or more forms. Each action information form corresponds to a single action. Actions are generally performed on source documents and the results of the action outputted in the form of a target document. Each source information form contains a list of databases in which one or more source documents may be located, instructions for identifying and locating said source documents, instructions for identifying and locating specific data within said source documents, and instruction for modifying data within said source documents. Each target information form contains a list of databases in which one or more target documents may be located or will be placed, instructions for placing or locating said target documents, instructions for locating specific data within said target documents, and instructions for modifying data within said target documents. The Reference information form is optional and contains a list of databases in which a reference document may be located, instructions for locating said reference document, instructions for locating specific data within said reference document, and instructions for modifying said data within said reference document. The executable is a software program that carries out the following steps: (1) examining all workflow control documents at regular intervals; (2) determining which workflow control documents contain timing schedules specifying that they be run during the current day and time; (3) loading said workflow control documents determined to be currently run into memory; (4) examining at regular intervals the trigger information forms linked to each said workflow control document to determine if appropriate trigger conditions have been satisfied by searching the databases specified within said trigger information form and determining whether the specified trigger document or Documents exist; (5) executing, if said trigger document or Documents exist, each action specified by each of said one or more action information forms linked to each said workflow control document. (6) searching for the existence of an End Document and regular time intervals, the existence of which results in the termination of the executable. The executable enters an idle state when not searching for documents or executing workflow processes. This frees up server system resources for use by the network.

It is instructive to briefly describe Notes. Throughout this Specification and in the claims the term "Notes" when capitalized means Lotus Notes® and is used interchangeably therewith. Notes is a currently extremely popular workgroup platform created and distributed by Lotus Development Corporation. Both "Lotus" and "Lotus Notes" are trademarks of Lotus Development Corporation.

Lotus Notes®

Notes is a workgroup platform that helps people network together more effectively. With Notes, people can work together regardless of platform or technical, organizational, or geographical boundaries. Notes-based information can be shared across any distance, and at any time of day or night.

Notes, like all workgroup platforms, is used inter alia for three basic types of applications: (1) disseminating information, such as news and reference materials; (2) routing information, such as mail and forms; and (3) executing interactive applications, such as discussions and tracking systems.

Notes consists of two primary programs: the Notes server and the Notes workstation. The Notes server—a computer running OS/2®—provides services to Notes workstations, workstation developers, and other Notes servers, including storage of shared databases and mail routing. The Notes workstation—the Macintosh or personal computer running Windows or Presentation Manager—communicates with Notes servers so you can use shared databases and read and send mail.

It must be observed that Notes servers are not the same as file servers. A file server is a computer that provides access to shared resources like printers and applications, and manages network traffic. A Notes server stores Notes databases and provides special Notes services such as mail routing and database replication. A single computer is generally not used simultaneously as a file server and a Notes server because proper Notes security could not be guaranteed otherwise. A Notes administrator may place the Notes workstation software on a file server for easy installation over the network, but that file server would not actually be running Notes.

The basic units of information in Notes are databases, the documents they contain, and the fields within documents. A database generally contains information in a single area of interest, such as a new product discussion or industry newswires. A database can be used by an individual, shared among a few people, or used by everyone on the network. Most databases are shared.

A local database resides on a Notes workstation. Local databases are generally personal databases, such as daily diaries or prototypes of new databases that aren't ready to be shared.

A shared database resides on one or more Notes servers, accessible by many developers. Databases can be copied to additional servers for easier access to many developers using a process called replication. With replication, changes to each database replica are distributed to all the others periodically. Through the use of security measures such as server access and database access, database managers can define who can use a database and to what extent.

A mail database usually resides on a Notes server too, but only one person can access a mail database. People who use Notes offsite (by dialing into servers using a modem instead of connecting to servers over a network) often store a replica (special copy) of their mail database locally. Notes mail is useful for private conversations and small group communications outside the public forum of shared databases.

Notes databases are accessed through a workspace. The menu item "Open Database" from the Notes "File" menu adds a database to the workspace. Each database added to the workspace, although physically stored on a Notes server, is represented on the workspace by an icon. When using Notes, one sees a window containing either the Notes workspace, a database view, or a database document.

A Notes database may be created from a database template. A template is a skeleton database that the developer can copy and modify. Templates do not contain data. Instead they contain one or more of the following: forms, fields, views, and macros, in addition to other elements. When the developer uses a template, he copies the structure of the template onto the new database he is creating. This saves time during development because templates, when properly designed, require little or no modification. In the Notes environment, database templates have an ".ntf" extension so as to distinguish them from the databases created using the templates, which databases have an ".nsf" extension.

Information is added to a Notes database by composing a new document, or editing an existing one. Text, tables, numerical data, graphics, scanned images, OLE (Object Linking and Embedding) objects, and voice messages may be added to the document. Future versions of Notes will permit embedding of video messages to these documents. Under Windows and PM, data from other Windows and PM programs may be linked or embedded in a Notes document using DDE (Dynamic Data Exchange). Designers of Notes databases are able to create forms to control how data is entered in documents and how and when it's displayed. The developer is also responsible for creating the views, as described above, to display lists of documents.

Any Notes document may be linked to another Notes document through the use of a DocLink. Two Notes documents linked by a DocLink need not be in the same database or, for that matter, on the same Notes server, so long as the other server is on the same network. A DocLink is another form of OLE.

New documents are immediately listed in one or more views and are available to anyone using that replica of the database. Developers of other replicas will see new information after the next scheduled replication. Replication occurs regularly on a schedule specified by the database manager and Notes server administrator, usually between once an hour and once a day.

A view is like a table of contents for a database, except that a view doesn't necessarily list every document in the database, and a single database may have multiple views, each organizing the documents differently. Each database, however, must have at least one view. Views may also be laid out in columns of information which may then be sorted by key. For example, a database could have the views By Date, By Author, and By Client. The views of a database are selected via the View menu. Private views are available to individual developers so as to enable them to display lists of documents that they are particularly interested in.

Notes protects information in a variety of ways. Developers are granted or denied access to Notes servers through the certificates stored in their Developer IDs. Each Notes database contains an Access Control List detailing who can open the database, and what they can do to its information. In addition, information can be encrypted so that only specific developers can decrypt it.

Notes servers and workstations can be on a single local area network (LAN) or a number of LANs, or on a wide-area network (WAN). Notes servers and workstations on different LANs can communicate through many media, including network bridges/routers, modem and telephone lines, null modems, or satellite. Notes servers and workstations are both simply nodes on the network. Shared databases (and the mail database) may be accessed from a remote location—as from a home computer or from a laptop—using a modem rather than using a network.

Components of the Invention

The preferred embodiment comprises a single executable, a keyword database, and a workflow control database template. When installing to a workgroup system running Lotus Notes, the single executable is copied into the Notes program directory, and the keyword database and a workflow control document template are copied into the Notes data directory. The keyword database may optionally be installed into a subdirectory of the Notes data directory. The workflow control database template will be used to create the workflow control database.

Workflow Control Database

The many actions that may be performed by the present invention use a simple methodology:

Move data from a source to a target.

The invention described herein uses several types of source data that are defined below. These types of source data are known as trigger, source and reference data. The present invention also writes results known as target data. In order to read and write such data within Notes, actions are performed. The invention performs one or more sequences of these actions that are specified by the developer. Each such sequence of actions is referred to as a single unit called a "workflow process." By installing the capability to move data among the databases of a workgroup platform, a Relational Workgroup Platform (RWP) is thereby attained.

A workflow process is started either at a given time of day or when one or more documents with specified characteristics are found. The time of day and/or documents with the specified characteristics are referred to as the "trigger" for the workflow process. When the present invention starts a workflow process as a result of finding of a trigger document, the process is said to be "event driven;" when the present invention starts a workflow process as a result of the occurrence of a specific time of day, the process is said to be "time driven." Once the workflow process is started, the present invention will then look for the source and target documents needed to perform each action specified within that workflow process. Each action has its own set of source and target data requirements.

All the information that invention needs to run workflow processes is contained in a workflow control database that is created within Notes using the control database template. The workflow control database comprises a set of documents that control the actions of the single executable.

The types of documents contained in the workflow control database are described below:

Workflow Control Documents

Workflow control documents contain the timing schedule for each workflow process defined by the developer. The timing schedule defines the days of the week and times of day during which the related workflow process should run, and a field that the developer uses make the process either a "polling" process or a "one shot" process ("polling" and "one shot" are defined later in this chapter.) The workflow control document also contains DocLinks to the Trigger Information and Action Information as defined below.

The developer must create one workflow control document for each workflow process the developer wishes to define.

In a preferred embodiment of the present invention, the workflow control document contains eight fields in which the developer may enter information required by the single executable to control a particular workflow process:

1. Workflow process name—A name used to identify the workflow process that this particular workflow control document controls. All documents associated with the workflow process are categorized under this name by the single executable.
2. Brief description of the process—A short written description for the benefit of the developer. This may also be used by the single executable for display purposes.
3. Polling selection—The developer of the present invention uses this field to specify whether the developer wishes the single executable to operate in its standard polling mode or whether it is to execute the workflow process only once, as a so-called "one-shot" process.
4. Timing schedule—Here the developer enters data, preferably in a table format, specifying the days of the week and times of each day the workflow process should run.
5. Trigger information form link—In this field the developer enters information that identifies a single trigger information form (described below). In a preferred embodiment, the developer simply "presses" a virtual push-button on the screen with the mouse and a blank trigger information form appears. When the developer finishes editing the trigger information form, a DocLink to the form is entered in this field.

In a preferred embodiment, if no trigger information form is created or identified, then the workflow process will either run continuously or once as a "one-shot" process depending on the developer's polling selection as described above.

6. Delete trigger ON/OFF—A toggle field specifying whether the trigger information form should be deleted after the workflow process is completed. If polling has been selected, this results in the workflow process running continuously after the first execution. If a one-shot process is selected, there is no significant effect other than the freeing of disk space.
7. Action table—In this field the developer enters information that identifies one or more action information forms. As with the trigger information field, a preferred embodiment allows the developer to press a virtual push-button with the mouse and be presented with blank action information forms. When done, a DocLink to each such form is entered in this field.

It is preferred that this field be in a table format and that at least about eight action information forms be made available for linking.

8. Mail notification—In a preferred embodiment, this field is presented as an option wherein the developer may specify recipients of electronic mail to be notified each time the workflow process is executed.

Trigger Information Document

A Trigger Information document allows the developer to define the manner in which trigger documents will be found and possibly modified by the single executable. This document is linked to the workflow control document, preferably by a DocLink.

In a preferred embodiment of the present invention, the trigger information form may be divided into two sections, the first comprising fields for containing essential information and the latter comprising fields for containing information related to optional features.

In a preferred embodiment of the present invention, the first section comprises five fields, the last three of which may be considered "subfields" (a, b, and c) of the second:

1. Trigger database list—In this field the developer enters a list of databases, or a list of formulas to derive the list of databases, in which the single executable will search for trigger documents. In a preferred embodiment, the developer simply specified pathnames to the desired database names, or a list of formulas to derive the list of pathnames to the desired database names, which said databases are identified by the ".nsf" extension in Notes, for example "sudir\\database.nsf" (in the Notes environment, a single backslash acts as a control character, therefore, double backslashes are required to specify pathnames).
2. Search method—In this field, the developer specifies one of three methods that the single executable may use to locate trigger documents:
   a) Selection formula method—In this field, the developer may enter an equation describing text in a named field within a trigger document. For example, the formula Form="person"

would cause the single executable to consider as trigger documents all documents having a field labeled "Form" and wherein the field contains the ASCII text "person". Likewise, the formula Name="Joe" & EmployeeNum<100 would cause the executable to consider as trigger documents all documents having a field labeled "Name" that contain the ASCII text "Joe" and a field labeled "EmployeeNum" having a numeric values less than 100.
   b) View without key values—In this field the developer may specify a Notes "View." All documents included within the View are considered to be trigger documents by the single executable.
   c) View with key values—In this field the developer may specified a special variant of a Notes View, namely a Notes View that contains sorted columns.

Columns sorted by key values within a View is a Notes feature. Here, the developer would specify a View and the key values that correspond to individual sorted columns.

In a preferred embodiment of the invention, the second section comprises two fields:

1. Optional field modifications—In this field the developer may specify fields within the trigger documents that are to be modified and what values they are to be set to or created using a combination of Notes functions and custom functions as described below. For example, the custom function @WITGetField( ) allows the user to reference field data on another open document—if there is one—for use on the current document. It is this added functionality that converts Notes from a workgroup platform into a Relational Workgroup Platform, permitting data to flow freely amongst the databases, since @WITGetField( ) may itself be used as an argument in another function.

The present invention augments the traditional field types that developers can use in the Notes Macro Language to include Reader Name Fields, Author Name Fields, and Name Fields. The invention also substantially improves over the Notes Macro Language by allowing the developer to create or append to Rich Text fields (using @WITGetField( ), @WITDocLink( ) and @WITFont( ), described below). Formulas or parts of formulas for field values may also be supplied from another open document using the @WITGetText( ) function.

2. Find and Replace—In this field, the developer may specify fields within trigger documents to inspect, the data to look for, and—if the data is found—the data to replace it with.

Action Information Documents

An action information document contains all the parameters needed by a specific instance of an action. Each instance and type of an action has its own action document. Multiple action information forms may be linked to any workflow control document. In a preferred embodiment of the invention, at least about eight such action information forms may be associated via DocLinks with any one workflow control document. The developer is therefore able to add up to eight actions per workflow process, and there is no restriction on combinations of available actions.

A set of blank action information forms are provided to the developer and are contained within the database template of the present invention. The developer chooses a particular action information form, edits it, and saves a copy of it. In doing so, the saved copy is linked to a particular workflow control document.

In a preferred embodiment of the invention, each action information form comprises the following fields available for the entry of data:

1. Source information—If an action requires source data, as most do, the developer may press a virtual push-button with his mouse and bring up a Source information form, which specifies source documents containing said source data to be used by the single executable. When done editing, a DocLink to the source information form is entered into this field.

2. Reference Information—Some actions need to access data other than source data. Documents containing such data are referred to herein as reference documents. Upon pressing this push-button, Reference Information will be created, and a DocLink to the Reference Information will appear within the Action Information below the ADD REFERENCE push-button that was originally pressed.

3. Target information—If an action requires target data, the developer may press a virtual push-button with his mouse and bring up a Target information form, which specifies target source documents or databases to be used by the single executable. When done editing, a DocLink to the target information form is entered into this field.

4. Action Block—Each action information form contains a section which contains the specific details to be used in this invocation of the action. This content of this section is dependent on the action chosen. Usually, in this section contains the developer may specify fields within the trigger documents that are to be modified or created using a combination of Notes functions and custom functions as described below.

5. Optional trigger document Field Modifications—In this field the developer may specify fields within the trigger documents that are to be modified and what values they are to be set to. Note that this field is identical in effect to that described in the trigger information document above.

6. Optional Action Information Document Modification—In this field, the developer may specify fields within the current action information form itself that are to be modified or created and what values they are to be set to by using a combination of Notes functions and custom functions as described below. These modifications will also be performed when the specified action has completed. The use of this section is optional.

7. Mail Notification—If the developer fills out this section of the Action Information, a mail message will be sent to developers and/or groups specified in a To: field when the workflow process has completed thereby notifying them of the action taken.

Source and Target Information Documents

Source Control Documents and Target Control Documents allow the developer to define the manner in which the related type of document will be found and possibly modified by the single executable. These documents are linked to the Action Information document for each action to be performed.

Source Information Documents

Multiple types of Source Information documents are provided within the database template of the present invention. Each one pertains to the information needed for the associated action. When editing the Action Information document in a preferred embodiment of the present invention, if an action needs to use source documents or data, one may press a virtual push-button to add information about the desired source documents or data to the action. Upon pressing this push-button, a Source Information document will be created, and a DocLink to the Source Information document will be inserted within the associated Action Information document.

The Source Information document allows the developer to enter information into five fields. The information so entered is used by the single executable to identify and optionally modify source documents.

1. Database List: In this field the developer enters a list of databases, or a list of formulas to derive the list of databases, in which the single executable will search for source documents. In a preferred embodiment, the developer simply specifies pathnames to the desired database names or a list of formulas to derive the pathnames to the desired database names. In Notes these database names are identified by the ".nsf" extension, for example "sudir\\database.nsf" (in the Notes environment, a single backslash acts as a control character, therefore, double backslashes are required to specify pathnames).

2. Search method—In this field, the developer specifies one of three methods that the single executable may use to locate source documents:

a) Selection formula method—In this field, the developer may enter an equation describing text in a named field within a source document. For example, the formula Form="person"

would cause the single executable to consider as source documents all documents having a field labeled "Form" and wherein the field contains the ASCII text "person". Likewise, the formula Name="Joe" & EmployeeNum<100 would cause the executable to consider as source documents all documents having a field labeled "Name" that contain the ASCII text "Joe" and a field labeled "EmployeeNum" having a numeric values less than 100.

b) View without key values—In this field the developer may specify a Notes "View." All documents included within the View are considered to be source documents by the single executable.

c) View with key values—In this field the developer may specified a special variant of a Notes View, namely a Notes View that contains sorted columns. Columns sorted by key values within a View is a Notes feature. Here, the developer would specify a View and the key values that correspond to individual sorted columns.

One of the important features and advancements of the present invention over the prior art is the ability to use information from other open documents that are used within an action—usually the current trigger, optional reference, or target—in the identification of the source documents. This is accomplished using the @WITGetField( ) function described below.

3. Find and Replace—In this field, the developer may specify fields within source documents to inspect, the data to look for, and—if the data is found—the data to replace it with.

4. Optional trigger document Field Modifications—In this field the developer may specify fields within the trigger documents that are to be modified and what values they are to be set to. Note that this field is identical in effect to that described in the trigger information document above. The use of this field is optional.

5. Optional source document Modification—In this field, the developer may specify fields within the source documents that are to be modified or created and what values they are to be set to by using a combination of Notes functions and custom functions as described below. These modifications will also be performed when the specified action has completed. The use of this section is optional.

Target Information Documents

Multiple types of Target Information documents are provided within the database template of the present invention. Each one pertains to the information needed for the associated action. When editing Action Information document in a preferred embodiment of the present invention, if an action needs to use a target one may press a virtual push-button to add information about the desired target to the action. Upon pressing this push-button, the appropriate Target Information document will be created, depending on the Action. After the creation of the Target Information document, a DocLink to it will be inserted within the Action Information document.

The Target Information document allows the developer to enter information into five fields. The information so entered is used by the single executable to identify and optionally modify target documents.

1. Database List: In this field the developer enters or a list of formulas to derive the list of databases in which the single executable will search for target documents or databases. In a preferred embodiment, the developer simply specifies pathnames to the desired database names or a list of formulas to derive the pathnames to the desired database names. In Notes these database names are identified by the ".nsf" extension, for example "sudir\\database.nsf" (in the Notes environment, a single backslash acts as a control character, therefore, double backslashes are required to specify pathnames).

2. Search method—In this field, the developer specifies one of three methods that the single executable may use to locate target documents:

a) Selection formula method—In this field, the developer may enter an equation describing text in a named field within a target document. For example, the formula Form="person"

would cause the single executable to consider as target documents all documents having a field labeled "Form" and wherein the field contains the ASCII text "person". Likewise, the formula Name="Joe" & EmployeeNum<100 would cause the executable to consider as target documents all documents having a field labeled "Name" that contain the ASCII text "Joe" and a field labeled "EmployeeNum" having a numeric values less than 100.

b) View without key values—In this field the developer may specify a Notes "View." All documents included within the View are considered to be target documents by the single executable.

c) View with key values—In this field the developer may specified a special variant of a Notes View, namely a Notes View that contains sorted columns. Columns sorted by key values within a View is a Notes feature. Here, the developer would specify a View and the key values that correspond to individual sorted columns.

3. Find and Replace—In this field, the developer may specify fields within target documents to inspect, the data to look for, and—if the data is found—the data to replace it with.

4. Optional trigger document Field Modifications—In this field the developer may specify fields within the trigger documents that are to be modified and what values they are to be set to. Note that this field is identical in effect to that described in the trigger information document above. The use of this field is optional.

5. Optional target document Modification—In this field, the developer may specify fields within the target documents that are to be modified or created and what values they are to be set to by using a combination of Notes functions and custom functions as described below. These modifications will also be performed when the specified action has completed. The use of this section is optional.

Optional Reference Document

Optional reference document: Each action may optionally find and use yet another type of document not provided by the workflow control template of the present invention. This document is referred to as the "reference document." The manner in which this document should be found and possibly modified is defined in the Optional reference document. This document is linked to the Action Information for each action to be performed.

The Reference Information document allows the developer to enter information into five fields. The information so entered is used by the single executable to identify and optionally modify reference documents.

1. Database List: In this field the developer enters or a list of formulas to derive the list of databases in which the single executable will search for optional reference documents. In a preferred embodiment, the developer simply specifies pathnames to the desired database names or a list of formulas to derive the pathnames to the desired database names. In Notes these database names are identified by the ".nsf" extension, for example "sudir\\database. nsf" (in the Notes environment, a single backslash acts as a control character, therefore, double backslashes are required to specify pathnames).

2. Search method—In this field, the developer specifies one of three methods that the single executable may use to locate reference documents:

a) Selection formula method—In this field, the developer may enter an equation describing text in a named field within a reference document. For example, the formula Form="person"

would cause the single executable to consider as reference documents all documents having a field labeled "Form" and wherein the field contains the ASCII text "person". Likewise, the formula Name="Joe" & EmployeeNum<100 would cause the executable to consider as reference documents all documents having a field labeled "Name" that contain the ASCII text "Joe" and a field labeled "EmployeeNum" having a numeric values less than 100.

b) View without key values—In this field the developer may specify a Notes "View." All documents included within the View are considered to be reference documents by the single executable.

c) View with key values—In this field the developer may specified a special variant of a Notes View, namely a Notes View that contains sorted columns. Columns sorted by key values within a View is a Notes feature. Here, the developer would specify a View and the key values that correspond to individual sorted columns.

3. Find and Replace—In this field, the developer may specify fields within reference documents to inspect, the data to look for, and—if the data is found—the data to replace it with.

4. Optional trigger document Field Modifications—In this field the developer may specify fields within the trigger documents that are to be modified and what values they are to be set to. Note that this field is identical in effect to that described in the trigger information document above. The use of this field is optional.

5. Optional reference document Modification—In this field, the developer may specify fields within the reference documents that are to be modified or created and what values they are to be set to by using a combination of Notes functions and custom functions as described below. These modifications will also be performed when the specified action has completed. The use of this section is optional.

Operation of the Single Executable

When the single executable is started, the timing schedules of all workflow control documents are examined and all workflow processes whose timing schedules specify that they should run during the current day are read into memory. In addition to the timing schedule, each workflow control document contains links as described above to all the other documents that contain the information required in the performance of this process.

In a preferred embodiment of the present invention, the timing schedule contains a starting and ending time of day for each day of the week. During the time interval defined for each day, the single executable will check for the appropriate time and trigger condition specified for each process. If the appropriate time and trigger condition requirements have been satisfied, the workflow process is run. The single executable will perform such checks using the databases listed in the Trigger Database List within the appropriate Trigger Information document every N seconds. In a preferred embodiment, N may be specified on the single executable command line. In a preferred embodiment of the invention, the single executable enters an idle state when not performing such checks in order to make the most economical use of server system resources.

The single executable then checks the databases listed in the Trigger Database List for the trigger document that will cause the related workflow process to start. Upon finding such a trigger document, the single executable will perform all the actions specified within the workflow control document in the specified order.

Each action defined by an Action Information Document typically uses source data, found in a source document that is located within a source database. Each action also typically works with data that will be placed into a target document that is located within a target database. Not all actions require source and/or target information. The developer has complete control over which documents become the source, trigger and target documents.

In the most preferred embodiment of the present invention, whenever the workflow process uses at most one document of a given type (e.g., a trigger document), if more than one document matches the specified search criteria, the document composed first will be selected. This is the case for all document types whenever a specific action uses at most one such document (e.g.,, the Optional reference document).

Preferred Actions

In a preferred embodiment of the invention, the actions listed below are available to the developer. Each is associated with an action information document as described above and may be categorized as follows:

Actions that work with data
actions that work with documents
actions that work with files
actions that work with parent/child documents
DocLink actions
special functions

Actions That Work With Data

These actions copy or move field information between documents. The documents that are involved in the exchange of the data are determined by the action, along with the source and target information specified within each instance of each action.

Copy Source Data to target document(s).
Copy Source Data to trigger document.
Copy Trigger Data to target document(s).
Find target document, then Move Source Data.
Find target document(s), then Copy Source Data.
Move Source Data to target document.
Move Source Data to trigger document.
Move Trigger Data To target document.

Actions That Work With Documents

These actions copy, create, delete, modify and move Notes documents. The documents that are involved in the performance of the action are determined by the action, along with the source and target information specified within each instance of each action.

Copy source document(s) to Target Database(s).
Copy trigger document to Target Database(s).
Create Document(s) in Target Database(s).
Delete Document(s) in Target Database(s).
Delete trigger document.
Modify Document(s) in Target Database(s).
Modify trigger document.
Move source document(s) to Target Database.
Move trigger document to Target Database.

Actions That Work With Files

These actions perform functions that relate to a file or a file attachment.

Attach File to target document(s).
Attach File to trigger document.
Detach File from target document(s).
Detach File from trigger document.
Download.
Export.
Import.
Remove File Attachment from target document(s).
Remove File Attachment from trigger document.

Actions That Work With Parent/Child Documents

These actions all work with Parent (Main) Documents and the associated Child (Response) Documents.

Convert Children Document(s) To Main Document.
Copy Source Parent Documents Children to target document(s).
Copy Source Parent & Children Document(s) to Target Database(s).
Delete Target Parent Document's Children.
Delete Target Parent & Children Document(s) in Target Database(s)..
Find Parent Document(s), then Create Response Document(s).
Modify Target Parent Document For Each Child.
Modify Target Parent & Children Document(s) in Target Database(s).
Move Source Parent Document's Children to target document.
Move Source Parent & Children Document(s) to Target Database.

DocLink Actions

These actions automate Notes' DocLink capabilities.

Create DocLink of source document(s) in target document(s).
Create DocLink of source document(s) in trigger document.
Create DocLink of trigger document In target document(s).

Special Actions

These actions are implemented in a more preferred embodiment of the invention so as to provide a wide variety of functionality. Several of these actions are natural extensions to the functionality of the base Notes product, while other actions within this category implement new types of functionality with respect to Notes.

Create Report.
Mail source document(s).
Number Generator.
Start Executable.
Update View(s).

Preferred Data Types, Field Formulas, and Functions

In a preferred embodiment of the invention, the features, data types, field formulas, and functions listed below are available to the developer. Functions are referred to as "@functions" in this disclosure because in Notes such functions are prefixed by the "@" symbol. In a marketed version of the present invention such functions are designated by the letters "@WIT" followed by the rest of the function name. This is merely a convention of convenience that will allow the reader of the disclosure herein to distinguish between the functions provided by the invention from functions already present in Notes, and is not to be interpreted as a limitation of the present invention. It is not at all necessary that the functions described herein have the actual names assigned to them in this disclosure or in the claims.

Field Modification Tables

All actions of the present invention have the capability to create, delete and modify fields, by permitting the developer to work with fields through the use of field modification tables. Field Modification Tables comprise three columns and may be explained as follows:

TABLE 1

Explanation of the Field Modification Table.

| Field Name(s) | Type | Formula(s) |
|---|---|---|
| This column contains the list of names of all the fields that are to be copied, created and/or modified. All the associated field information and formulas are in the following columns. Each entry is separated from the previous entry using, preferably, the Enter Key. (The New Line is preferably the list separator). Example: FieldOne FieldTwo FieldThree | This column contains the list of field types for all the field names of the fields that are to be copied, created and/or modified, listed in the previous column. Each entry is separated from the previous entry using, preferably, the Enter Key. (The New Line is preferably the list separator). The number of entries in this column is equal to the number of entries in the field name column. | This column contains the list of field formulas for the fields that are to be copied, created and/or modified, listed in the first column. Each entry is separated from the previous entry using, preferably, the Enter Key. (The New Line is preferably the list separator). The number of entries in this column is equal to the number of entries in the field name column. If No Formula is desired, enter a * First, each entry in this list will first be parsed and all @ functions will be calculated, then the formula will be passed to Lotus Notes to calculate the data value. |

The items within the Field Modification Table may be described as follows:

Field Name(s): Name of the field to modify. The field name may be no longer than 50 characters long. In the example above, three fields named "LastName", "Balance", and "AccountDate" have been specified.

Field Types: The field type of the field to modify. The field type will determine the manner in which the field's data may be manipulated. Field data types are discussed below.

Field Formulas: Used to calculate the field value of an existing field or newly created field. The calculated value will be of the type specified in the Field Type column.

Each column in the formula modification table is a list. In a preferred embodiment, up to 64 entries may be entered into the list for most actions. Exceptions to this rule are the Download, Import and Export Actions, which should accommodate up to 128 entries each. Each entry is separated from the previous entry with an separator character, such as a carriage return. For each field name entered, an associated field type is specified. Any field previously specified within the list may be used in a given formula.

Field Types

In general, the preferred embodiment of the present invention may handle the following types of data:

TABLE 2

Field types at a high level.

| Type | Description |
|---|---|
| TEXT | Any textual data. Cannot include formatting information. |
| NUMBER | Any numeric data. May include either integer values or floating-point values. |
| TIME/DATE | Data may include a date, a time of day or both depending on formatting. |
| RICH TEXT | Any textual data, which may include formatting information, text color, bitmaps and Notes-specific objects such as DocLink pushbuttons. |

More specifically, the field types as used within the Field Modification Tables are tabulated below. Several field types may work with the same Notes data types while treating the existing and/or new field data in different ways; these differences are described below:

TABLE 3

Data Types.

| Code | Type | Action Description |
|---|---|---|
| T | Text | The specified field is overwritten with the value calculated by the appropriate formula. |
| TA | Text Author | The specified field is overwritten with the value calculated by the appropriate formula. The resulting field is "flagged" as an author field. |

TABLE 3-continued

Data Types.

| Code | Type | Action Description |
|---|---|---|
| TR | Text Reader | The specified field is overwritten with the value calculated by the appropriate formula. The resulting field is "flagged" as a reader field. |
| TN | Text Name | The specified field is overwritten with the value calculated by the appropriate formula. The resulting field is "flagged" as a name field, |
| N | Number | The specified field is overwritten with the value calculated by the appropriate formula. |
| D | Date/Time | The specified field is overwritten with the value calculated by the appropriate formula. |
| Ra | Rich Text | Append the value calculated by the appropriate formula to the existing field value. If the field does not exist, the field will be created and the value calculated by the appropriate formula will be the only data in the specified field. These formulas must use the syntax described within the Rich Text Formula Syntax section below. |
| Rc | Rich Text | Create a field using the value calculated by the appropriate formula. If the field already exists, it will be overwritten. These formulas must use the syntax described within the Rich Text Formula Syntax section below. |
| Rta | Rich Text | Append the value calculated by the appropriate formula to the existing field value. If the field does not exist, the field will be created and the value calculated by the appropriate formula will be the only data in the specified field. Field formulas using this type must return text-only values. All of the valid Notes @ functions may be used with fields that specify this type. The calculated text value will be converted to (Notes) Rich Text format. |
| Rtc | Rich Text | Create a field using the value calculated by the appropriate formula. If the field already exists, it will be overwritten. Field formulas using this type must return text-only values. All of the valid Notes @ functions may be used with fields that specify this type. The calculated text value will be converted to (Notes) Rich Text format. |

Field Formula Usage

The formulas that the developer may use for Text, Number & Date/Time fields are identical to normal Notes field formulas with the following exceptions:

Developers may use the @WITGetField( ) and @WITGetText( ) functions, which are described below.

Developers may not use the following Notes formula functions. All other Notes formula functions may be used within the field formulas of the invention. These functions are not supported by the present invention because these functions are not supported by Notes within the Notes server environment—rather than workgroup environment—and the invention runs within the Notes server environment:

TABLE 4

Notes formula functions that are not available within the invention. All other Notes formula functions not listed here may be safely used within the field formulas of the present invention.

Unavailable Notes Formula Functions

@Command()
@DbLookup()
@DbColumn()
@DDEInitiate()
@DDETerminate()
@DDEExecute()
@DDEPoke()
@MailSend()

Relational Workgroup Platform

The two most important and frequently used custom functions of the present invention are @WITGetField( ) and @WITGetText( ). The addition of either functionality to Lotus Notes converts Notes from a simple workgroup platform into a Relational Workgroup Platform, though the former is vastly more powerful as it is capable of retrieving field data of any type, including text.

Data in the resulting Relational Workgroup Platform becomes malleable and fluid because functions, particularly @WITGetField( ), may be used as arguments in other functions, for example:

@WITIf(CONDITION; @WITGetField(DOC_TYPE; "ThisField"; T); "Action")

or, for that matter, as an argument nested within itself:

@WITGetField(@WITGetField(DOC_TYPE; "ThisField"; T); "ThatField"; T)

The invention and Notes cooperatively process field formulas in such a way that the invention may implement new @functions. These @ functions may be used in the formulas for Text, Rich Text, Number and Date/Time fields:

TABLE 5

Formula functions that are used to retrieve field data.

Formula Function Syntax

@WITGetField( DOC_TYPE; FIELD_NAME; FIELD TYPE)
@WITGetText( DOC_TYPE; FIELD_NAME)

@WITGetField( ) is used to retrieve field-level data from a Notes document as a value of a specified type; if the specified type is "text" then the text representation of the data is returned as a string delimited by quotes.

@WITGetText( ) returns only the text representation of the data requested; this text representation is not delimited by quotes. It is preferred that these @ functions be capable of retrieving data from all the types of documents that may be created within the workflow control database (that is, target documents, source documents and the like). The DOC_TYPE parameter specifies the type of document from which to get the data. It is preferred that @ function parameters not be case-sensitive.

The following table lists the legal values for the DOC_TYPE parameter:

TABLE 6

Document Types.

| DOC_TYPE | Description |
|---|---|
| TRD | Trigger document. |
| SD | Source document. |
| TD | Target document. |
| RD | Optional reference document. |
| DL | Download input document. |
| AD | Action Information. |

The FIELD_NAME parameter specifies the name of the field from which data should be retrieved. FIELD_NAME is passed to @WITGetField( ) and @WITGetText( ) without quotes. The FIELD_NAME parameter is not case-sensitive.

The @WITGetField( ) function uses a FIELD_TYPE parameter. The FIELD_TYPE parameter specifies the data type of the value to be returned by @WITGetField( ).

The following table lists the legal values for the FIELD_TYPE parameter:

TABLE 7

FIELD_TYPE Values.

| FIELD_TYPE | Description |
|---|---|
| T | Text |
| N | Number |
| D | Date/Time |
| R | Rich Text |

If the data type of the field from which the data is being retrieved is different than the data type specified within the FIELD_TYPE parameter, the invention will convert the value if the conversion is legal. The FIELD_TYPE parameter is not case-sensitive.

The following table specifies the type conversions supported by @WITGetField( ):

Supported Type Conversions. An "OK" indicates that the conversion of data from the type specified on the left side of the table to the type specified on the top of the table is supported by the preferred embodiment of the present invention.

| "To" Data Type "From" Data Type | T | N | D | R |
|---|---|---|---|---|
| T | OK | Text consisting of an optional plus or minus sign followed by numeric digits with an optional decimal point will be converted to a Notes number | | OK |
| N | OK | OK | | OK |
| D | OK | | OK | OK |
| R | | | | OK |

If the field whose data is to be retrieved contains the value "xxxxxxxxxx", @WITGetField( ) will return values according to varying FIELD_TYPE parameters as follows:

TABLE 9

Sample @WITGetField() return values.

| Type | Result |
|---|---|
| Text (T): | "xxxxxxxxxx" |
| Number (N): | Identical to the return value of @TextToNumber("xxxxxxxxxx") |
| Date/Time (D): | Identical to the return value of @TextToTime("xxxxxxxxxx") |

The @WITGetText( ) function returns only the text representation of the data requested. @WITGetText( ) may be used to insert information into a formula that may be used as part of the formula itself, rather than merely producing a string value.

Rich Text Formula Syntax

Whenever rich text data is to be created or manipulated and placed into a rich text field, it is preferred that the rich text formula syntax described within this section be used. With the exception of @WITGetText( ) and @WITGetField( ), the @ functions described within this section may be used only within Notes rich text fields.

All rich text-specific @ functions return rich text values; these values may be concatenated onto other rich text values or expressions using the plus ("+") character.

The following example demonstrates all the rich text @ functions along with all other types of valid rich text expressions. The example uses these rich text-based items to build a rich text value by concatenating several rich text items. Any one of these rich text-based items may be used both multiple times and in any given order within a given rich text field formula, so long as no more than 100 such items are used in any one formula. Within the example, ten such items are used. While a rich text formula is being evaluated, fields specified within the formula that are not rich text fields are converted into an in-memory rich text format that will be used to further evaluate the formula. This conversion is performed only to evaluate the formula and does not modify the original field in any way:

FIELD_NAME+
@WITFont(FACE; SIZE; COLOR; ATTRIBUTE)+
"STATIC TEXT"+

@WITGetText(DOC_TYPE; FIELD NAME)+
@WITGetField(DOC_TYPE; FIELD_NAME; T )+
@WITGetField(DOC_TYPE; FIELD_NAME; R)+
@WITIf(CONDITION; "ThisFieldName"; "OtherFieldName" )+
@WITNewLine+
@WITDocLink(DOC_TYPE; "Comments")

A description of each portion of the preceding expression follows:

FIELD_NAME—retrieves the value of the specified field. If the specified field is a rich text field, it will be used within the formula with its original formatting information intact. The specified field exists within the document specified within the title of the field modification table being used.

@WITFont(FACE; SIZE; COLOR; ATTRIBUTES)— @WITFont( ) is used to specify the font to be used for all following text within a given rich text formula. Text preceding a given @WITFont( ) function call within a given formula is not affected by that @WITFont( ) function call.

It is preferred that parameters to @WITFont( ) be simple integers and function as follows.

FACE

Specifies the font of the rich text data to follow @WITFont( ). Legal values for the FACE parameter are specified in the following table.

TABLE 10

Legal FACE parameter values for @WITFont(). Note that the specified values are the only values supported by the invention.

| FACE Value | Description |
|---|---|
| 0 | Roman font family. These fonts are generally proportionally spaced "serif" fonts. |
| 1 | Swiss font family. These fonts are generally proportionally spaced "sans serif" fonts. |
| 4 | Typewriter font family. These fonts are generally monospaced "serif" fonts. |

SIZE

Specifies the font size of the rich text data to follow @WITFont( ). Font sizes are specified in points.

COLOR

Specifies the color of the rich text data to follow @WITFont( ). Legal values for the COLOR parameter are specified in the following table.

TABLE 11

Legal COLOR parameter values for @WITFont().

| COLOR Value | Description |
|---|---|
| 0 | Black. |
| 1 | White. |
| 2 | Red. |
| 3 | Green. |
| 4 | Blue. |
| 5 | Magenta. |
| 6 | Yellow. |
| 7 | Cyan. |

ATTRIBUTES

Specifies the font attributes of the rich text data to follow @WITFont( ). One or more ATTRIBUTES may be combined to produce the desired font effect by adding the values corresponding to each desired ATTRIBUTES value together.

Legal values for the ATTRIBUTES parameter are specified in the following table:

TABLE 12

Legal ATTRIBUTE parameter values for @WITFont().

| ATTRIBUTE Value | Description |
|---|---|
| 0 | Normal. |
| 1 | Bold. |
| 2 | Italic. |
| 4 | Underline. |
| 8 | Strikeout. |
| 16 | Superscript. |
| 32 | Subscript. |

For example, the formula @WITFont(*; 12; 2; 6)+"ALERT" will produce the following rich text value:

ALERT where the letters are printed in red. The example uses the current font with a size of 12 points, color red (number 2) using an italic underlined typeface (6=2+4, where 2 represents italic and 4 represents underline).

"STATIC TEXT"—Creates a rich text value containing the specified quote-delimited text.

@WITGetText(DOC_TYPE; FIELD_NAME)—Uses the text within the field FIELD_NAME in document DOC_TYPE as a field name itself within the rich text formula.

@WITGetField(DOC TYPE; FIELD_NAME; T)—Uses the text within the field FIELD_NAME in document DOC_TYPE as a static text string within the rich text formula.

When the last parameter of @WITGetField( ) is equal to T, the text will be formatted according to either the parameters specified within the formula's most recent call to @WITFont( ) or the default formatting properties for rich text fields in effect at the time the rich text formula is evaluated by the single executable.

@WITGetField(DOC_TYPE; FIELD_NAME; R)—Copies the rich text value from the field FIELD_NAME in document DOC_TYPE as a rich text object into the rich text formula.

When the last parameter of @WITGetField( ) is equal to R, if the field FIELD_NAME is a rich text field, the data within field FIELD_NAME will be used within the formula with its original formatting information intact. If the field FIELD_NAME is not a rich text field, @WITGetField( ) will behave identically to a call to @WITGetField( ) wherein the last parameter is T.

@WITIf(CONDITION; "ThisFieldName"; "OtherFieldName")—CONDITION is a Boolean expression similar in form to the condition parameter of the Lotus Notes @WITIf( ) field function. If CONDITION evaluates to TRUE, ThisFieldName is returned to the rich text formula as a field name. If CONDITION evaluates to FALSE, OtherFieldName is returned to the rich text formula as a field name.

@WITNewLine—Used to specify a blank line within the rich text value being created.

@WITDocLink(DOC_TYPE; "Comments" )—Creates a DocLink object to the document of the specified type. "Comments" will appear as pop-up text near the DocLink icon when a user positions the mouse pointer over the icon and holds down the left mouse button.

"Comments" does not need to be a static text string; it may instead be a formula that results in a text string. Such a formula may not legally result in a rich text string, otherwise @WITDocLink( ) will not be able to interpret "Comments."

Although the present invention has been described in detail, it should be understood that various changes, substitutions, and alterations can be made hereto without departing from the spirit and scope of the invention and that the embodiments and drawings disclosed herein are for illustrative purposes only and that the scope of the present invention is to be limited only by the claims herein.

What is claimed is:

1. A Relational Workgroup Platform comprising:
   a workgroup platform; and
   a @WITGetField( ) function; and
   wherein:
   said workgroup platform comprises:
   a server functionality comprising means of storing databases for and amongst a network of computer workstations, said databases comprising data fields;
   functions for manipulating data and data fields within said databases, and for writing data to and retrieving data from said data fields from within any one or more of said databases;
   said @WITGetField( ) function comprises:
   means of retrieving data from a data field of one said database and transferring same to another said database; and
   wherein said @WITGetField( ) functionality is usable as an argument in one or more other functions.

2. The Relational Workgroup Platform of claim 1 wherein:
   said workgroup platform is Lotus Notes.

3. The Relational Workgroup Platform of claim 1, further comprising a single executable comprising code for carrying out the steps comprising:
   examining all workflow control documents in a workflow control database at regular intervals;
   determining which workflow control documents contain timing schedules specifying that they be run during the current day and time;
   loading said workflow control documents determined to be currently run into memory;
   examining at regular intervals the trigger information forms linked to each said workflow control document to determine if appropriate trigger conditions have been satisfied by searching the databases specified within said trigger information form and determining whether the specified trigger document or Documents exist;
   executing, if said trigger document or Documents exist, each action specified by each of said one or more action information forms linked to each said workflow control document;
   said workflow control database comprising:
   a workflow control document;
   a trigger information form;
   at least one action information form;
   a source information form;
   a target information form; and
   a reference information form.

4. The invention of claim 3 wherein:
   each said action information form comprises data linking said action information form to at least one source information form, target information form, or reference information form; and instructions specifying an action to be performed upon said one or more forms.

5. The invention of claim 4 wherein each said action to be performed is one selected from the group consisting of:
   Copy Source Data to target document(s);
   Copy Source Data to trigger document;
   Copy Trigger Data to target document(s);
   Find target document, then Move Source Data;
   Find target document(s), then Copy Source Data;
   Move Source Data to target document;
   Move Source Data to trigger document;
   Move Trigger Data To target document;
   Copy source document(s) to Target Database(s);
   Copy trigger document to Target Database(s);
   Create Document(s) in Target Database(s);
   Delete Document(s) in Target Database(s);
   Delete trigger document;
   Modify Document(s) in Target Database(s);
   Modify trigger document;
   Move source document(s) to Target Database;
   Move trigger document to Target Database;
   Attach File to target document(s);
   Attach File to trigger document;
   Detach File from target document(s);
   Detach File from trigger document;
   Download;
   Export;
   Import;
   Remove File Attachment from target document(s);
   Remove File Attachment from trigger document;
   Convert Children Document(s) To Main Document;
   Copy Source Parent Document's Children to target document(s);
   Copy Source Parent & Children Document(s) to Target Database(s);
   Delete Target Parent Document's Children;
   Delete Target Parent & Children Document(s) in Target Database(s).;
   Find Parent Document(s), then Create Response Document(s);
   Modify Target Parent Document For Each Child;
   Modify Target Parent & Children Document(s) in Target Database(s);
   Move Source Parent Document's Children to target document;
   Move Source Parent & Children Document(s) to Target Database;
   Create DocLink of source document(s) in target document (s);
   Create DocLink of source document(s) in trigger document;
   Create DocLink of trigger document In target document (s);
   Create Report;
   Mail source document(s);
   Number Generator;
   Start Executable; and
   Update View(s).

6. The invention of claim 3 wherein:

said workflow control document comprises timing schedule data defining the dates and times during which said workflow control document is to be loaded and run; data linking said workflow control document to said trigger information form; data linking said workflow control document to one or more action information forms;

said trigger information form comprises a list of databases in which one or more trigger documents may be located and instructions for locating said trigger documents;

said source information form comprises a list of databases in which one or more source documents may be located; instructions for locating said source documents; instructions for locating specific data within said source documents; and instruction for modifying data within said source documents;

said target information form comprises a list of databases in which one or more target documents may be located or will be placed; instructions for placing or locating said target documents; instructions for locating specific data within said target documents; and instructions for modifying data within said target documents;

said reference information form comprises a list of databases in which a reference document may be located; instructions for locating said reference document; instructions for locating specific data within said reference document; and instructions for modifying said data within said reference document.

7. The invention of claim 1 further comprising a @WITGetText( ) function, said @WITGetText( ) function comprising:

means of retrieving text data from a data field of one said database and transferring same to another said database; and wherein said @WITGetText( ) functionality is usable as an argument in one or more other functions.

8. A Relational Workgroup Platform, comprising:

a single executable;

a keyword database; and a workflow control database template; and wherein:

said keyword database comprising a list of keywords to be recognized by said executable as command syntax;

said workflow control database template comprising Workgroup Platform template means for creating a workflow control database containing:

a workflow control document;
a trigger information form;
at least one action information form;
a source information form;
a target information form; and
a reference information form;

said executable comprising code for carrying out the steps comprising:

examining all workflow control documents at regular intervals;

determining which workflow control documents contain timing schedules specifying that they be run during the current day and time;

loading said workflow control documents determined to be currently run into memory;

examining at regular intervals the trigger information forms linked to each said workflow control document to determine if appropriate trigger conditions have been satisfied by searching the databases specified within said trigger information form and determining whether the specified trigger document or Documents exist; and executing, if said trigger document or Documents exist, each action specified by each of said one or more action information forms linked to each said workflow control document.

9. The Relational Workgroup Platform of claim 8 wherein:

said workgroup platform is Lotus Notes.

10. The invention of claim 8 wherein:

each said action information form comprises data linking said action information form to at least one source information form, target information form, or reference information form; and instructions specifying an action to be performed upon said one or more forms.

11. The invention of claim 10 wherein each said action to be performed is one selected from the group consisting of:

Copy Source Data to target document(s);

Copy Source Data to trigger document;

Copy Trigger Data to target document(s);

Find target document, then Move Source Data;

Find target document(s), then Copy Source Data;

Move Source Data to target document;

Move Source Data to trigger document;

Move Trigger Data To target document;

Copy source document(s) to Target Database(s);

Copy trigger document to Target Database(s);

Create Document(s) in Target Database(s);

Delete Document(s) in Target Database(s);

Delete trigger document;

Modify Document(s) in Target Database(s);

Modify trigger document;

Move source document(s) to Target Database;

Move trigger document to Target Database;

Attach File to target document(s);

Attach File to trigger document;

Detach File from target document(s);

Detach File from trigger document;

Download;

Export;

Import;

Remove File Attachment from target document(s);

Remove File Attachment from trigger document;

Convert Children Document(s) To Main Document;

Copy Source Parent Document's Children to target document(s);

Copy Source Parent & Children Document(s) to Target Database(s);

Delete Target Parent Document's Children;

Delete Target Parent & Children Document(s) in Target Database(s);

Find Parent Document(s), then Create Response Document(s);

Modify Target Parent Document For Each Child;

Modify Target Parent & Children Document(s) in Target Database(s);

Move Source Parent Document's Children to target document;

Move Source Parent & Children Document(s) to Target Database;

Create DocLink of source document(s) in target document(s);

Create DocLink of source document(s) in trigger document;

Create DocLink of trigger document In target document(s);

Create Report;

Mail source document(s);

Number Generator;

Start Executable; and

Update View(s).

12. The invention of claim 8 wherein:

said workflow control document comprises timing schedule data defining the dates and times during which said workflow control document is to be loaded and run; data linking said workflow control document to said trigger information form; data linking said workflow control document to one or more action information forms;

said trigger information form comprises a list of databases in which one or more trigger documents may be located and instructions for locating said trigger documents;

said source information form comprises a list of databases in which one or more source documents may be located; instructions for locating said source documents; instructions for locating specific data within said source documents; and instruction for modifying data within said source documents;

said target information form comprises a list of databases in which one or more target documents may be located or will be placed; instructions for placing or locating said target documents; instructions for locating specific data within said target documents; and instructions for modifying data within said target documents;

said reference information form comprises a list of databases in which a reference document may be located; instructions for locating said reference document; instructions for locating specific data within said reference document; and instructions for modifying said data within said reference document.

13. The invention of claim 8 further comprising a @WITGetField( ) function, said @WITGetField( ) function comprising:

means of retrieving data from a data field of one said database and transferring same to another said database; and wherein said @WITGetField( ) functionality is usable as an argument in one or more other functions.

14. The invention of claim 8 further comprising a @WITGetText( ) function, said @WITGetText( ) function comprising:

means of retrieving text data from a data field of one said database and transferring same to another said database; and wherein said @WITGetText( ) functionality is usable as an argument in one or more other functions.

* * * * *

UNITED STATES PATENT AND TRADEMARK OFFICE
CERTIFICATE OF CORRECTION

PATENT NO. : 5,855,014          Page 1 of 2
DATED : December 29, 1998
INVENTOR(S) : Smith It is certified that error appears in the above-identified patent and that said Letters Patent is hereby corrected as shown below:

Column 16, line 2, "Documents" should read --Document's--.

Column 20, line 61, "FIELD TYPE" should read --FIELD_TYPE--.

Column 21, line 52, insert --TABLE 8--.

Column 22, delete lines 1-5.

Column 23, line 1, "FIELD NAME" should read --FIELD_ NAME--.

Column 23, line 25, "FACE" should read --FACE:--.

Column 23, line 42, "SIZE" should read --SIZE:--.

UNITED STATES PATENT AND TRADEMARK OFFICE
CERTIFICATE OF CORRECTION

PATENT NO. : 5,855,014
DATED : December 29, 1998
INVENTOR(S) : Smith

It is certified that error appears in the above-identified patent and that said Letters Patent is hereby corrected as shown below:

Column 23, line 45, "COLOR" should read --COLOR:--.

Column 23, line 63, "ATTRIBUTES" should read --ATTRIBUTES:--.

Column 24, line 31, "DOC TYPE" should read --DOC_TYPE--.

Signed and Sealed this

Eighth Day of June, 1999

*Attest:*

Q. TODD DICKINSON

*Attesting Officer*   Acting Commissioner of Patents and Trademarks